(12) United States Patent
Lee et al.

(10) Patent No.: US 12,423,272 B2
(45) Date of Patent: Sep. 23, 2025

(54) DATA MANAGEMENT METHOD AND DEVICE FOR DIAGNOSING DEFECT OF COLLABORATIVE ROBOT

(71) Applicant: AJOU UNIVERSITY INDUSTRY-ACADEMIC COOPERATION FOUNDATION, Suwon-si (KR)

(72) Inventors: Jung Won Lee, Seoul (KR); Ye Seul Park, Incheon (KR); Dong Yeon Yoo, Suwon-si (KR); Yang Gon Kim, Siheung-si (KR); Su Bin Bae, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 219 days.

(21) Appl. No.: 18/261,440

(22) PCT Filed: Dec. 21, 2021

(86) PCT No.: PCT/KR2021/019506
§ 371 (c)(1),
(2) Date: Jul. 13, 2023

(87) PCT Pub. No.: WO2022/154293
PCT Pub. Date: Jul. 21, 2022

(65) Prior Publication Data
US 2024/0066703 A1  Feb. 29, 2024

(30) Foreign Application Priority Data

Jan. 15, 2021  (KR) .................. 10-2021-0005874

(51) Int. Cl.
*G06F 16/20* (2019.01)

(52) U.S. Cl.
CPC .... *G06F 16/20* (2019.01); *G05B 2219/39412* (2013.01)

(58) Field of Classification Search
None
See application file for complete search history.

(56) References Cited

U.S. PATENT DOCUMENTS

| 2019/0212352 A1* | 7/2019 | Apker | G01N 35/00623 |
| 2021/0326731 A1* | 10/2021 | Nasle | G06F 30/27 |
| 2022/0219326 A1* | 7/2022 | Riek | B25J 9/1664 |

FOREIGN PATENT DOCUMENTS

| JP | 2011125976 | 6/2011 |
| KR | 20170131603 | 11/2017 |
| KR | 20180068102 | 6/2018 |

OTHER PUBLICATIONS

Bae, S.B. et al., "Analysis of requirements and design of black box for diagnosing failure of cooperative robot", Jan. 8, 2021, https://linda-suup.tistory.com/45. (English Machine Translation Provided).
(Continued)

*Primary Examiner* — Eddy Cheung
(74) *Attorney, Agent, or Firm* — NORTON ROSE FULBRIGHT US LLP

(57) ABSTRACT

The present invention relates to a method and device for diagnosing a defect of a collaborative robot, the method comprising the steps in which: an electronic device generates a sensing data structure for managing sensing data collected from at least one collaborative robot; the electronic device generates an operation data structure for managing operation data associated with the operation of the collaborate robot; the electronic device generates a malfunction data structure for managing malfunction data of a point in which the severity of the operation equals to or is higher than a threshold; and the electronic device stores data collected from the at least one collaborative robot in accordance with
(Continued)

the structures. Application to other embodiments is also possible.

10 Claims, 7 Drawing Sheets

(56) References Cited

OTHER PUBLICATIONS

Bae, S.B. et al., "Fault Prediction by identifying programmable motions for predictive maintenance of a collaborative robot", Jan. 8, 2021, https://linds- suuup.tistory.com/46. (English Machine Translation Provided).

International Search Report and Written Opinion issued in corresponding PCT Application No. PCT/KR2021/019506, mailed Mar. 24, 2022. (English Translation of ISR Provided).

* cited by examiner

10

200

DATA MANAGEMENT METHOD AND DEVICE FOR DIAGNOSING DEFECT OF COLLABORATIVE ROBOT

CROSS-REFERENCE TO RELATED APPLICATIONS

This application is a national phase application under 35 U.S.C. § 371 of International Application No. PCT/KR2021/019506, filed Dec. 21, 2021, which claims priority to and the benefit of Korean Application No. 10-2021-0005874, filed Jan. 15, 2021. The contents of the referenced patent applications are incorporated into the present application by reference.

FIELD OF THE DISCLOSURE

The present invention relates to a data management method and device for diagnosing a defect of a collaborative robot.

DESCRIPTION OF RELATED ART

A smart factory means an intelligent production plant that can improve productivity, quality and customer satisfaction by combining information communications technology (ICT), to which digital automation solutions are combined, with industrial robots in the production process of design, development, manufacturing, distribution and logistics. Such a smart factory is being implemented mainly by large corporations.

However, since the industrial robot operated in the existing factory is designed to perform the same operation, there is a problem in that the operation of the industrial robot itself needs to be changed when the design of a product is changed or the type of a product is changed. In addition, most small and medium-sized enterprises (SME) lack the conditions or capabilities to promote the smart factory on their own, making it difficult to apply the smart factory, and the workers of the SMEs, whose working environment is poorer than that of large enterprises, are continuously exposed to the poor working environment.

For this reason, in recent years, smart factories are sometimes implemented by using laborative robots that are programmed to perform various tasks, and since these collaborative robots perform various tasks, the complexity of the tasks is high, and thus, there is a problem in that it is not easy to analyze the status of the collaborative robot by using only the sensed data regardless of the tasks performed by the collaborative robot.

SUMMARY

The exemplary embodiments of the present invention for solving these conventional problems are directed to providing a data management method and device for diagnosing a defect or a collaborative robot that perform the generation, collection and storage of data that is essentially required to diagnose a defect or failure of a collaborative robot.

Moreover, the exemplary embodiments of the present invention are directed to providing a data management method and device for diagnosing a defect of a collaborative robot that define the level of severity for a failure of a collaborative robot by implementing a data structure for analyzing data that is collected from a collaborative robot.

The method for managing data for diagnosing a defect of a collaborative robot according to an exemplary embodiment of the present invention may include the steps of generating, by an electronic device, a sensing data structure for managing sensing data collected from at least one collaborative robot; generating, by the electronic device, an operation data structure for managing operation data associated with the operation of the collaborative robot; generating, by the electronic device, a failure data structure for managing failure data at a time point when the operation has a severity that is greater than or equal to a threshold value; and storing, by the electronic device, data collected from the at least one collaborative robot according to the structure.

In addition, the step of generating a sensing data structure may be a step of generating the sensing date structure comprising data on specifications of the collaborative robot, data on a plurality of joints constituting the collaborative robot, and data on a plurality of sensors that are provided in the collaborative robot.

In addition, the sensing data may include physical information about the collaborative robot and be collected in real time or periodically from a plurality of sensors that are provided in the collaborative robot.

In addition, the step of generating an operation data structure may be a step of generating the operation data structure including the date and time according to the operation of the collaborative robot, the severity of the operation, an identifier for the operation, and detailed information associated with the operation.

In addition, the operation data may include operation information, status information, communication information and failure information of the collaborative robot, and be collected non-periodically according to the operation of the collaborative robot.

In addition, the step of generating an operation data structure may include the steps of checking the operation data at a time point when the operation occurs in the collaborative robot; and defining the severity of the operation of the collaborative robot as level 1, level 2 and level 3 based on the operation data.

In addition, the method may further include the step of diagnosing a defect or failure of the collaborative robot, after the step of storing data collected from the at least one collaborative robot.

In addition, the step of diagnosing a defect or failure of the collaborative robot may include the steps of generating the failure data by combining the sensing data and the operation data at a time point when the operation data is collected, when the severity of the operation for operation data collected from the collaborative robot corresponds to any one of level 2 and level 3; and confirming a time point when a defect or failure of the collaborative robot has occurred based on the failure data.

Moreover, the black box device for managing data for diagnosing a defect of a collaborative robot according to an exemplary embodiment of the present invention may include a communicator for performing communication with at least one collaborative robot; a controller for generating a sensing data structure for managing sensing data collected from the collaborative robot, an operation data structure for managing operation data associated with the operation of the collaborative robot, and a failure data structure for managing failure data at a time point when the operation has severity that is greater than or equal to a threshold value; and a memory for storing the sensing data structure, the operation data structure and the failure data structure.

In addition, the controller may generate the sensing data structure comprising data on specifications of the collaborative robot, data on a plurality of joints constituting the collaborative robot, and data on a plurality of sensors provided in the collaborative robot.

In addition, the controller may generate the sensing data structure with the sensing data, which is physical information about the collaborative robot collected in real time or periodically from a plurality of sensors provided in the collaborative robot.

In addition, the controller may generate the operation data structure comprising the date and time according to the operation of the collaborative robot, the severity of the operation, an identifier for the operation, and detailed information associated with the operation.

In addition, the controller may generate the operation data structure with the operation data comprising operation information, status information, communication information and failure information about the collaborative robot collected non-periodically according to the operation of the collaborative robot.

In addition, the controller may define the severity of the operation of the collaborative robot as level 1, level 2 and level 3 based on the operation data confirmed at a time point when the operation occurs in the collaborative robot.

In addition, the controller may generate the failure data by combining the sensing data and the operation data at a time point when the operation data is collected, when the severity of the operation for operation data collected from the collaborative robot corresponds to any one of level 2 and level 3, and confirm a time point when a defect or failure of the collaborative robot has occurred based on the failure data.

As described above, since the data management method and device for diagnosing a defect of a collaborative robot according to the present invention perform the generation, collection and storage of data that is essentially required for diagnosing a defect or failure of a collaborative robot, it has the effect of managing data for diagnosing a defect of a collaborative robot.

As described above, since the data management method and device for diagnosing a defect of a collaborative robot according to the present invention implement a data structure for analyzing data that is collected from a collaborative robot, it has the effect of being able to define the level of severity for the failure of a collaborative robot so as to provide the systematic management of data that is generated to diagnose a failure or defect.

DETAILED DESCRIPTION OF THE INVENTION

Figure 1:
FIG. 1 is a diagram showing a system for managing data for diagnosing a defect of a collaborative robot according to an exemplary embodiment of the present invention.

Hereinafter, preferred exemplary embodiments according to the present invention will be described in detail with reference to the accompanying drawings. The detailed description set forth below in conjunction with the appended drawings is intended to describe exemplary embodiments of the present invention and is not intended to represent the only exemplary embodiments in which the present invention may be practiced. In order to clearly describe the present invention in the drawings, parts that are irrelevant to the description may be omitted, and the same reference numerals may be used for the same or similar components throughout the specification.

In an exemplary embodiment of the present invention, expressions such as "or" and "at least one" may indicate one of the words listed together, or a combination of two or more. For example, "A or B" and "at least one of A and B" may include only one of A or B, or both A and B.

FIG. 1 is a diagram showing a system for managing data for diagnosing a defect of a collaborative robot according to an exemplary embodiment of the present invention.

Referring to FIG. 1, the system 10 according to the present invention includes a collaborative robot 100 and a black box device 200. Moreover, in an exemplary embodiment of the present invention, it is described as an example that the black box device 200 performs communication with one collaborative robot 100, but the present invention is not limited thereto, and it may perform communication with a plurality of collaborative robots.

The collaborative robot 100 is a type of robot that builds a smart factory system, and it refers to a robot that is placed into a delicate task that requires human participation and performs the task in connection with the human. Such a collaborative robot 100 performs various tasks that are driven by programming rather than a predetermined fixed task.

Although not illustrated, the collaborative robot 100 includes a plurality of joints and a plurality of sensors that are provided in at least one of the inside and the outside of each joint. The collaborative robot 100 acquires sensing data from a plurality of sensors that are provided in the collaborative robot 100. The collaborative robot 100 performs a plurality of operations by designed programming, and acquires operation data for when the operations are performed. The collaborative robot 100 transmits the acquired sensing data and operation data to the black box device 200. To this end, the collaborative robot 100 performs at least one of wireless communication and wired communication with the black box device 200.

The black box device 200 is an electronic device such as a computer or tablet PC, and manages data for diagnosing a defect or failure of the collaborative robot 100 through communication with the collaborative robot 100, and diagnoses a fault or failure of the collaborative robot 100. The main configuration of the black box device 200 will be described in more detail with reference to FIG. 2 below.

Figure 2:
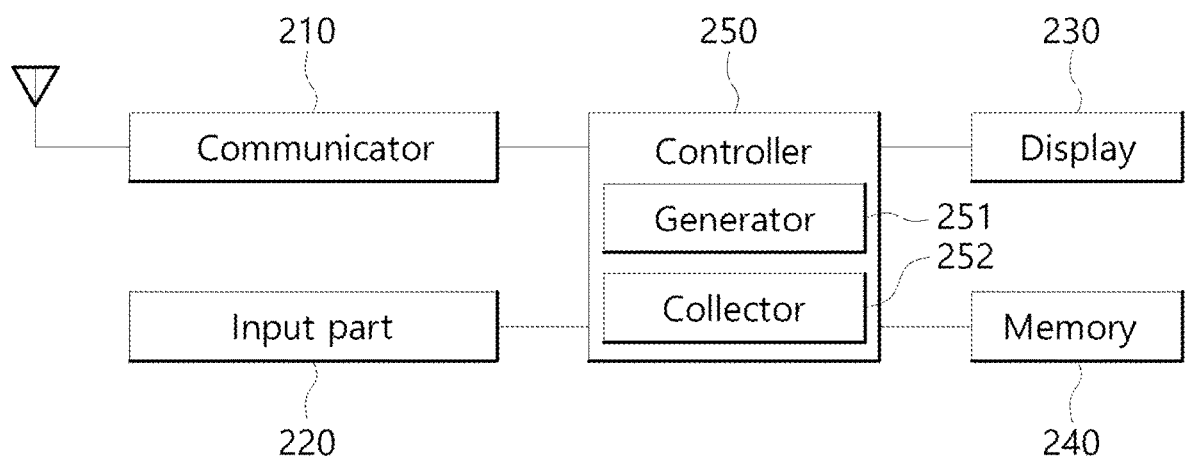
FIG. 2 is a diagram illustrating a black box device for managing data for diagnosing a defect of a collaborative robot according to an exemplary embodiment of the present invention.

FIG. 2 is a diagram illustrating a black box device for managing data for diagnosing a defect of a collaborative robot according to an exemplary embodiment of the present invention.

Referring to FIG. 2, the black box device 200 according to the present invention includes a communicator 210, an input part 220, a display 230, a memory 240 and a controller 250, and the controller 250 includes a generator 251 and a collector 252.

The communicator 210 receives sensing data and operation data from the collaborative robot 100 through communication with the collaborative robot 100, and provides the same to the controller 250. To this end, the communicator 210 may perform wireless communication such as $5^{th}$ generation communication (5G), long term evolution (LTE), long term evolution-advanced (LTE-A), wireless fidelity (Wi-Fi) and the like, and it is possible to perform wired communication using a cable.

The input part 220 generates input data in response to a user's input of the black box device 200. To this end, the input part 220 may include an input device such as a keyboard, a mouse, a keypad, a dome switch, a touch panel, a touch key, a button and the like.

The display 230 outputs output data according to the operation of the black box device 200. To this end, the display 230 may include a display device such as a liquid crystal display (LCD), a light emitting diode (LED) display and an organic light emitting diode (OLED) display. Moreover, the display 230 may be implemented in the form of a touch screen in combination with the input part 220.

The memory 240 stores operation programs of the black box device 200. The memory 240 stores the sensing data and operation data received from the collaborative robot 100, but in order to manage the sensing data and operation data, it stores in the form of a sensing data structure and an operation data structure generated by the controller 250. In this case, the data stored in the memory 240 may be generated and stored in various formats, for example, XML, CSV, DB and the like based on a user program such as xmlGenerator, csvGenerator and insertToDB.

The controller 250 generates a sensing data structure for managing the sensed data received from the collaborative robot 100, and generates an operation data structure for managing operation data associated with the operation of the collaborative robot 100. When the operation data has a severity that is greater than or equal to a threshold value, the controller 250 generates failure data by combining the sensing data and the operation data, and generates a failure data structure for managing the operation data. The controller 250 stores the generated data structure in the memory 240. To this end, the controller 250 includes a generator 251 and a collector 252.

The generator 251 generates a sensing data structure, an operation data structure and a failure data structure, and stores the same in the memory 240. Moreover, the generator 251 defines a severity level for a defect or failure of the collaborative robot 100 based on the operation data. In this case, the severity may be defined as level 1, level 2 and level 3, and level 1 refers to information for providing simple information about the operation that has occurred in the collaborative robot 100, level 2 refers to information on the occurrence of an abnormal (e.g., anomaly) operation that can be a precursor symptom of a defect or failure, and level 3 refers to information when an abnormal operation is driven due to a defect or failure. In addition, the generator 251 generates a failure data structure for cases in which the severity of the operation data collected from the collaborative robot 100 is greater than or equal to a threshold value, for example, level 2 or higher.

More specifically, the generator 251 checks operation information, status information, communication information, failure information and physical information according to the operation process of the collaborative robot 100. To this end, although not illustrated, the generator 251 generates modules for managing operation information, status information, communication information, failure information and physical information, respectively. In this case, the operation information module is a module for managing power, operation program and operation command information of the collaborative robot 100. The status information is a module for managing status information and status transition information by the operation of the collaborative robot 100. The communication information is a module for managing communication status information with the collaborative robot 100 or another server (not illustrated). The failure information is a module for managing failure and defect information of the collaborative robot 100. The physical information is a module for managing sensing data obtained from a plurality of sensors that are provided in the collaborative robot 100.

In this case, the operation information, status information, communication information and failure information are operation data generated non-periodically according to the operation of the collaborative robot 100, and the physical information is sensing data generated in real time from a time point when the power of the collaborative robot 100 is turned on to a time point when the power is turned off for the operation of the collaborative robot 100. Moreover, the sensing data may be sensing data obtained from a plurality of sensors (e.g., a current measuring sensor, a voltage measuring sensor, a temperature measuring sensor, an angle measuring sensor, etc.) that are provided inside and outside the collaborative robot 100. In this way, since the information obtained in the operation process of the collaborative robot 100 includes the operation data that occurs non-periodically and the sensing data that occurs in real time, the controller 250 divides the data structure into two types and generates the same, and generates a failure data structure for when the operation data has a severity of level 2 or higher.

The collaborative robot 100 has a plurality of joints according to axial degrees of freedom, and various sensors are provided for each joint. Accordingly, the generator 251 generates a sensing data structure by dividing the sensing data into device data, joint data and sensor data according to the physical object unit of the collaborative robot 100. The generator 251 stores the generated sensing data structure in the memory 240.

In the sensing data structure, the device data includes information on the specifications of the collaborative robot 100, and particularly, it includes fields for inputting information about device ID, device name, axis freedom, development version, manufacturer and production date.

The joint data in the sensing data structure includes information on the drivable physical range defined for each joint of the collaborative robot 100, and particularly, it includes fields for inputting information on the joint identification number, load, maximum speed, maximum torque and operating radius.

In the sensing data structure, sensor data includes information generated according to the characteristics of various sensors for position, speed, torque, temperature, pressure, vision and the like that are provided for each joint, and particularly, it includes fields for inputting information about the sensor identification number, sensor name and measurement value. In this case, the measurement value is a field in which a value sensed in real time is recorded, and it additionally includes a field for inputting the sensing value, unit, and period information.

The generator 251 generates an operation data structure that is capable of linking the sensing data and operation data because it is difficult to check operation information on the operation of the collaborative robot 100 (e.g., a task performed by the collaborative robot 100, a program executed to perform the task, an operation performed due to program execution, etc.) by using only the sensing data. To this end, the generator 251 generates an operation data structure based on the operation of the collaborative robot 100 that occurs according to a state transition of the collaborative robot 100 and stores the same in the memory 240. The operation data structure includes fields for inputting data on the date and time, level, identifier and message of the operation of the collaborative robot 100.

The date includes fields for inputting the date and time information when each operation has occurred, and the level includes fields for inputting the information of level 1, level 2 and level 3 according to the severity level of the operation data of the collaborative robot 100. The identifier is an input field that can identify the operations that are generated by the collaborative robot 100, and different identifiers are generated according to the type of the generated operation. The message is a field in which details about the operations generated by the collaborative robot 100 can be input in text form.

The generator 251 generates a failure data structure in which the sensing data and the operation data are combined when the severity level confirmed based on the operation data is level 2 or higher. More specifically, the generator 251 generates failure data by combining the sensing data and operation data at a time point recognized as a defect or failure of the collaborative robot 100. To this end, the generator 251 maps the sensing data structure and the operation data structure such that the sensing data from a time point when the power of the collaborative robot 100 is turned on to a time point when the collaborative robot 100 is turned off and the sensing data generated by the operation of the collaborative robot 100 can be managed by mapping.

Moreover, since the failure data is generated at a time point when a defect or a failure is recognized, the failure data is generated non-periodically, and the failure data may be generated by including a critical time before and after the defect or failure is recognized based on the time point when the defect or failure is recognized.

The collector 252 collects sensing data and operation data from the collaborative robot 100. In this case, the sensed data is collected in real time, and the operation data is collected whenever an operation occurs in the collaborative robot 100. The collector 252 inputs the collected sensing data and operation data according to the generated sensing data structure and operation data structure. The collector 252 identifies a time point when the severity of the operation data corresponds to level 2 and level 3 among the collected operation data. That is, when operation data having a severity of level 2 and level 3 is confirmed among the collected operation data of the collaborative robot 100, the controller 250 confirms that a defect or failure has been detected in the collaborative robot 100. The controller 250 generates failure data by combining the operation data at the time point corresponding to level 2 and level 3 of severity and the sensing data at the corresponding time point. The controller 250 displays the identified defect or failure on the display 230 and inputs the failure data according to the failure data structure.

Figure 3:
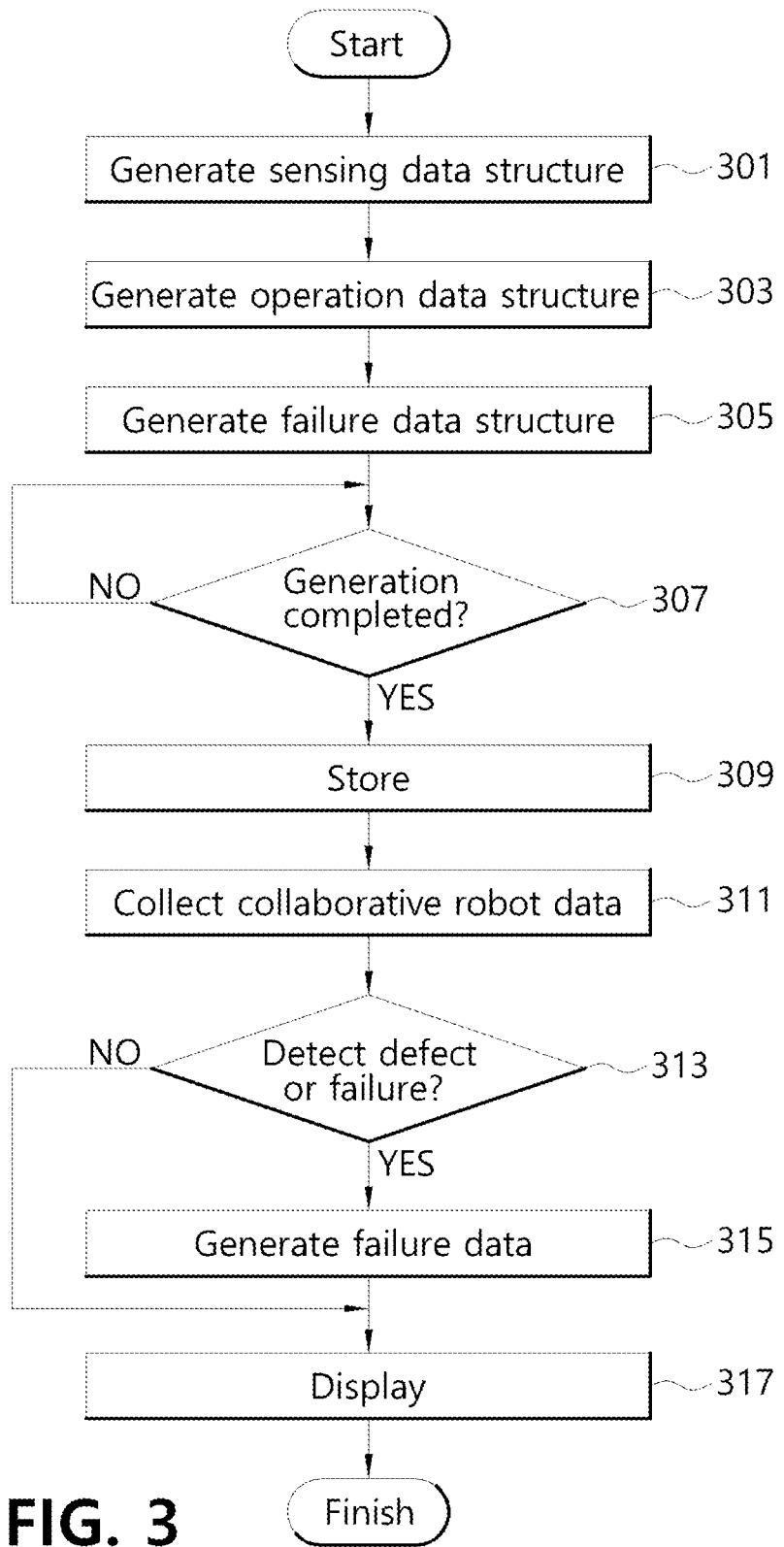
FIG. 3 is a flowchart illustrating the method for managing data for diagnosing a defect of a collaborative robot according to an exemplary embodiment of the present invention.

FIG. 3 is a flowchart illustrating the method for managing data for diagnosing a defect of a collaborative robot according to an exemplary embodiment of the present invention.

Figure 4A:
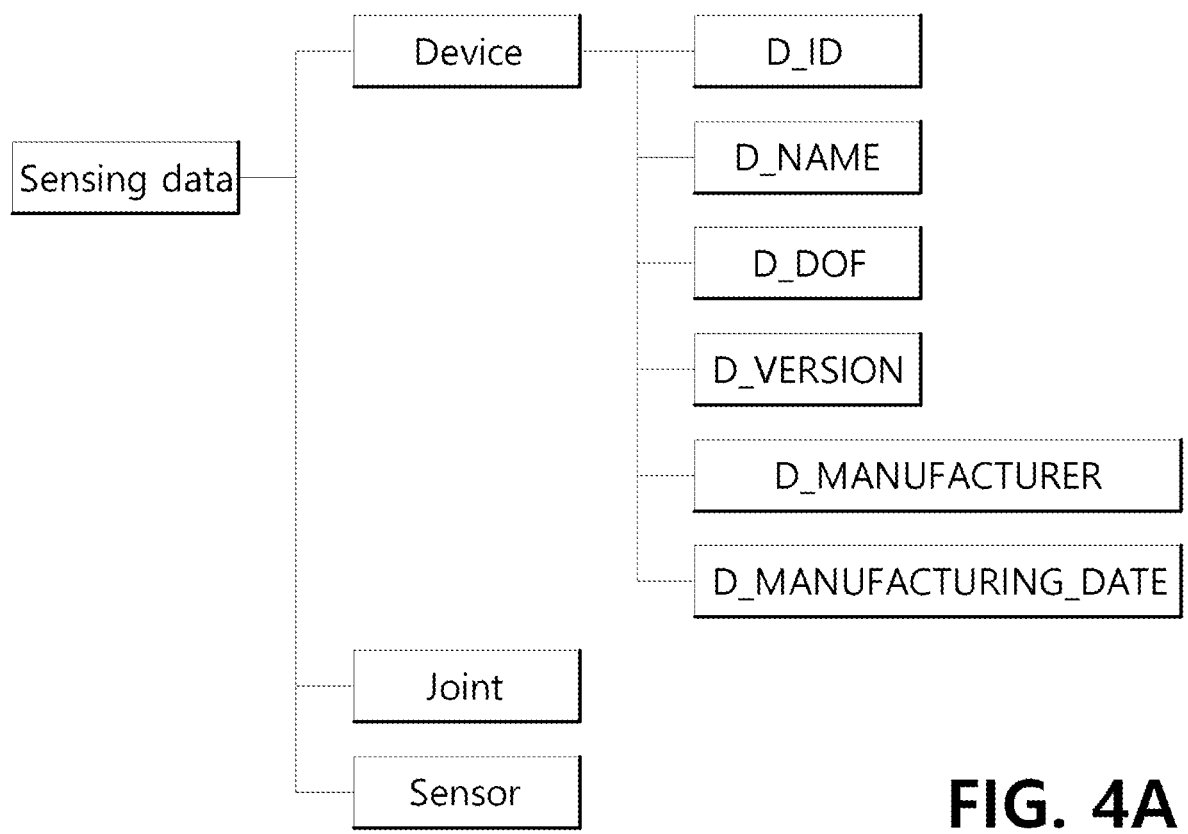
FIGS. 4a to 4c are diagrams illustrating a sensing data structure for managing sensing data that is received from a collaborative robot according to an exemplary embodiment of the present invention.
Figure 4B:
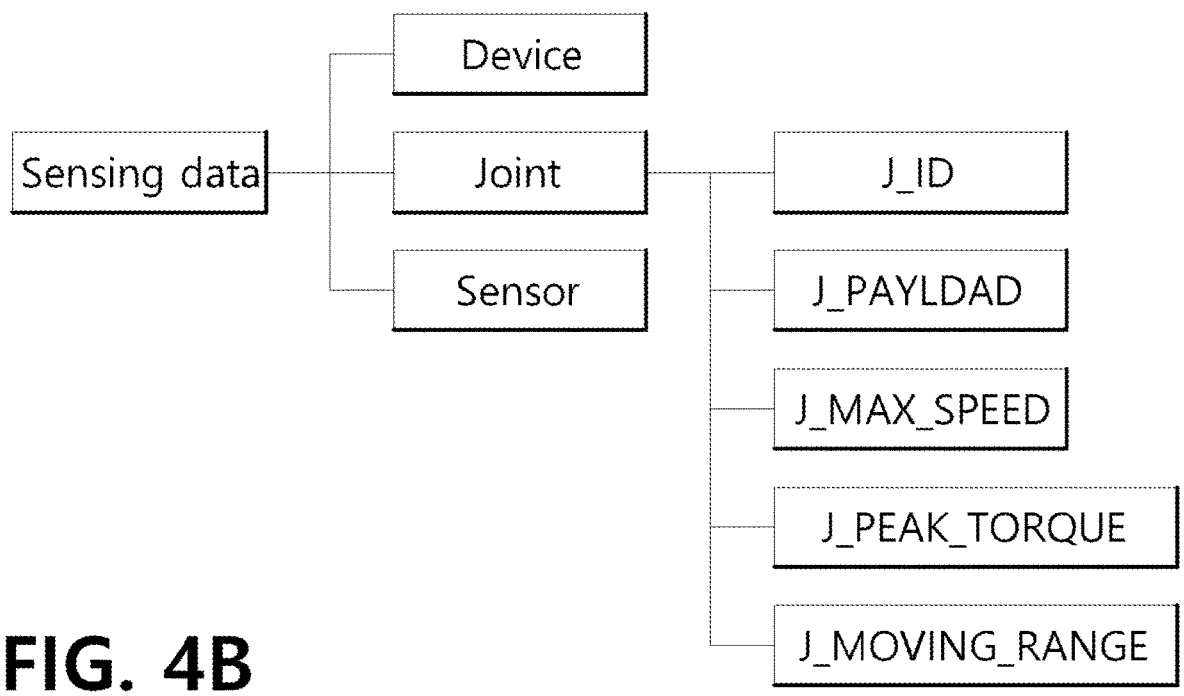
Figure 4C:
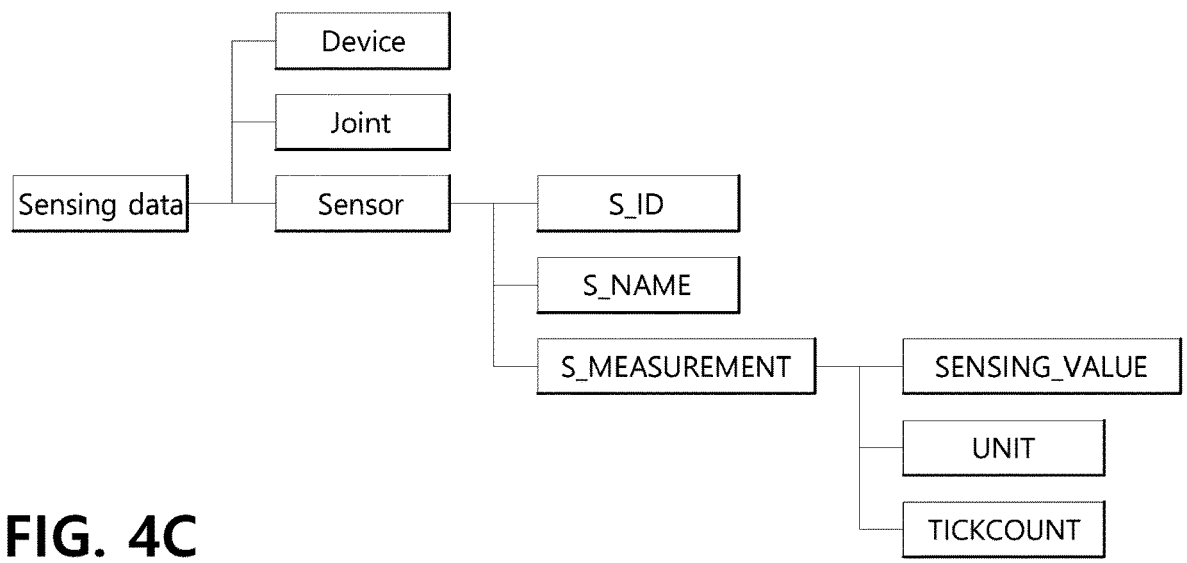
Figure 5:
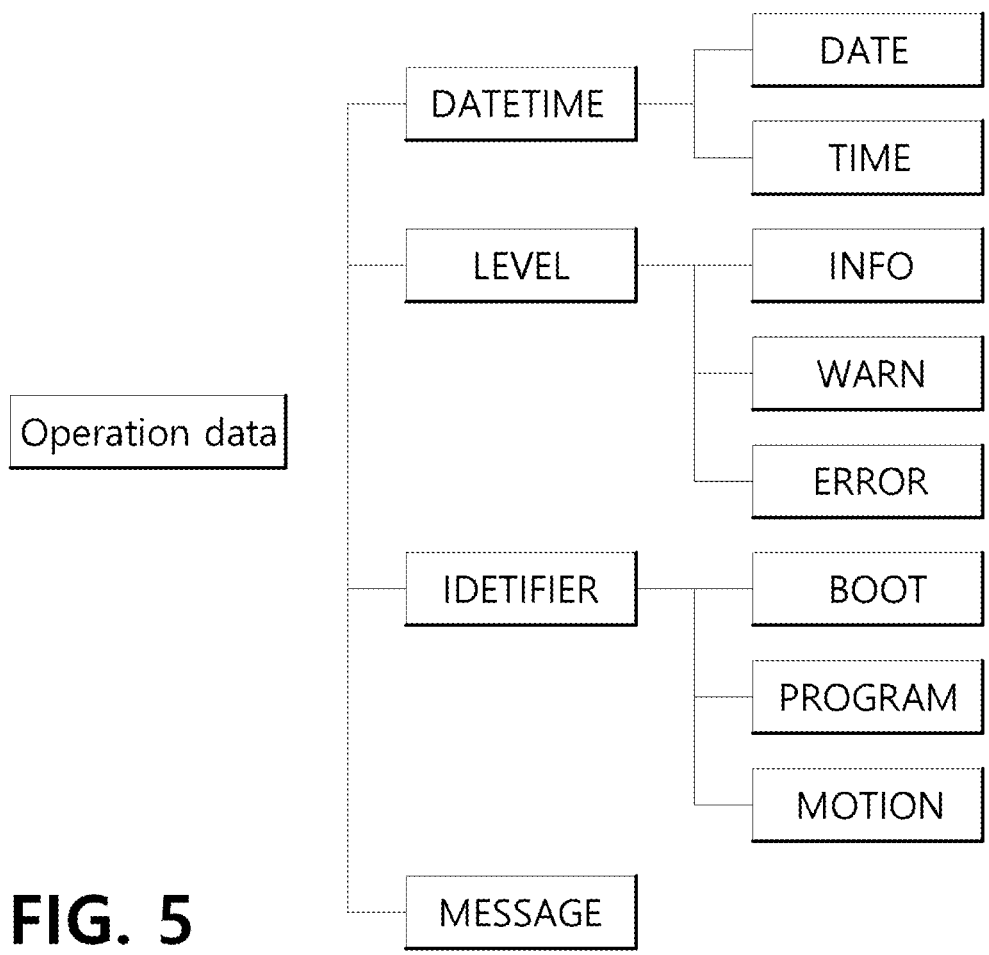
FIG. 5 is a diagram illustrating an operation data structure for managing operation data that is received from a collaborative robot according to an exemplary embodiment of the present invention.
Figure 6:
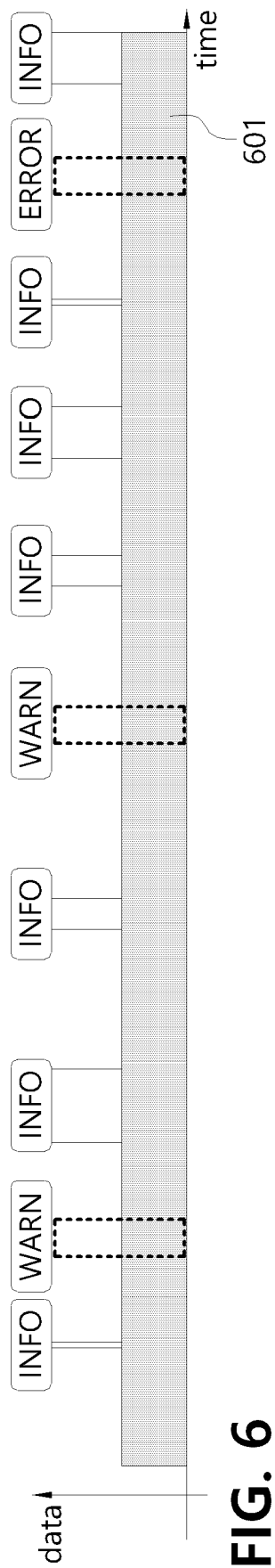
FIG. 6 is an exemplary diagram illustrating data generated according to the operation of a collaborative robot based on the generated data structure according to an exemplary embodiment of the present invention.

FIGS. 4a to 4c are diagrams illustrating a sensing data structure for managing sensing data that is received from a collaborative robot according to an exemplary embodiment of the present invention. FIG. 5 is a diagram illustrating an operation data structure for managing operation data that is received from a collaborative robot according to an exemplary embodiment of the present invention. FIG. 6 is an exemplary diagram illustrating data generated according to the operation of a collaborative robot based on the generated data structure according to an exemplary embodiment of the present invention.

Referring to FIGS. 3 to 6, in step 301, the controller 250 generates a sensing data structure. More specifically, the collaborative robot 100 has a plurality of joints according to an axial degree of freedom (DOF), and various sensors are provided for each joint. For this reason, the controller 250 generates a sensing data structure by dividing the sensing data into device data, joint data and sensor data according to a physical object unit as shown in FIGS. 4a to 4c. FIG. 4a shows the structure of device data, FIG. 4b shows the structure joint data, and FIG. 4c shows the structure of sensor data.

The device data is information about the specifications of the collaborative robot 100, and it includes fields for inputting information about device ID (D_ID), device name (D_NAME), axial degree of freedom (D_DOF), development version (D_VERSION), manufacturer (D_MANUFACTURER) and production date (D_MANUFACTURING_DATE).

The joint data is information on the drivable physical range defined for each joint of the collaborative robot 100, and it includes fields for inputting information about a joint identification number (J_ID), load (J_PAYLOAD), maximum speed (J_MAX_SPEED), maximum torque (J_PEAK_TORQUE) and operation range (J_MOVING_RANGE).

The sensor data is information generated according to the characteristics of various sensors for position, speed, torque, temperature, pressure, vision and the like that are provided for each joint, and it includes fields for inputting information n about a sensor identification number (S_ID), sensor name (S_NAME) and measurement value (S_MEASUREMENT). In this case, the measurement value is a field in which a value sensed in real time is recorded, and additionally includes fields for inputting a sensing value (SENSING_VALUE), unit (UNIT) and period (TICKCOUNT) information.

In step 303, the controller 250 generates a structure of the operation data. The controller 250 generates an operation data structure that is capable of linking the sensed data and the operation data because it is difficult to check the operation information on the work and operation performed by the collaborative robot 100 only with the sensing data. In this case, the operation data may include operation information, program execution information, operation execution information, error information and the like of the collaborative robot 100, and it is generated when the status transition of the collaborative robot 100 occurs.

More specifically, the operation data means data acquired non-periodically according to the operation generated by the collaborative robot 100 according to the characteristics of the data. Accordingly, the controller 250 generates an operation data structure as shown in FIG. 5. Referring to FIG. 5, the operation data structure includes fields for inputting data on a date and time (DATETIME), a level (LEVEL), an identifier (IDENTIFIER) and a message (MESSAGE) when an operation occurs.

The date (DATETIME) includes fields for inputting the date (DATE) and time (TIME) information of each operation, and the level (LEVEL) includes fields for inputting the information of level 1 (INFO), level 2 (WARN) and level 3 (ERROR). In this case, the level (LEVEL) indicates the severity of each operation generated in the collaborative robot 100. Level 1 (INFO) refers to information for providing simple information about the operation that is generated by the collaborative robot 100, and level2 (WARN) refers to information of cases in which an abnormal (e.g., anomaly) operation that may be a precursor to a defect or failure occurs and the operation is abnormally driven, and level 3 (ERROR) refers to information of cases in which the operation is abnormally driven because a defect or failure has occurred. As described above, the controller 250 may define a normal standard for the operation performed in the collaborative robot 100 at a specific time, while defining the level according to the severity.

The identifier (IDENTIFIER) is an input field that can identify the operations generated in the collaborative robot 100, and different identifiers are generated according to the type of the generated operation. The message (MESSAGE) is a field for inputting detailed information about the operations generated by the collaborative robot 100 in text form.

Subsequently, in step 305, the controller 250 generates a structure of the failure data. In this case, the failure data is generated by combining the sensing data and the operation data when the severity of the operation data is level 2 or higher, that is, at the time point when a defect or failure is recognized in the collaborative robot 100. To this end, the controller 250 maps the sensing data structure and the operation data structure generated in steps 301 and 303 such that the sensing data from a time point when the power of the collaborative robot 100 is turned on to a time point when the power of the collaborative robot 100 is turned off and the operation data generated by the operation of the collaborative robot 100 can be managed by mapping Moreover, since the failure data is generated at a time point when a defect or a failure is recognized, the failure data is generated non-periodically, and the failure data may be generated by including a critical time before and after the defect or failure is recognized based on the time point. The failure data may be an operation corresponding to level 2 (WARN) and level 3 (ERROR) at the level of the operation data structure set in step 303.

In step 307, the controller 250 checks whether the generation of the data structure has been completed through steps 301 to 305. As a result of checking in step 307, if it is confirmed that the generation of the data structure is completed, the controller 250 performs step 309, and if it is not confirmed that the generation of the data structure is completed, the controller 250 continuously checks whether the generation of the data structure is completed.

In step 309, the controller 250 stores the generated data structure in the memory 240, and performs step 311. In step 311, the controller 250 collects sensing data and operation data from the collaborative robot 100. As shown in FIG. 6, the sensing data 601 is collected in real time, and operation data is collected whenever an operation occurs in the collaborative robot 100. The controller 250 inputs the collected sensing data and operation data according to the sensing data structure and operation data structure generated in steps 301 and 303, respectively.

In step 313, the controller 250 checks whether a defect or failure is detected in the collaborative robot 100. In this case, the controller 250 checks the time points at which the severity of the operation data corresponds to level 2 (WARN) and level 3 (ERROR) based on the collected operation data. That is, when the operation data whose severity is level 2 and level 3 is confirmed among the operation data of the collaborative robot 100 collected in step 311, the controller 250 performs step 315 by confirming that a defect or failure has been detected in the collaborative robot 100 based thereon. When the operation data whose severity is level 1 is confirmed among the operation data of the collaborative robot 100 collected in step 311, the controller 250 performs step 317 by confirming that a defect or failure has not been detected in the collaborative robot 100 based thereon.

Subsequently, in step 315, the controller 250 generates failure data. That is, when the operation data whose severity is level 2 and level 3 is confirmed among the operation data of the collaborative robot 100 according to the confirmation result in step 313, the controller 250 combines the operation data at the corresponding time point and the sensing data at the corresponding time point to generate failure data. In step 317, the controller 250 displays the identified defect or failure on the display 230.

For example, as shown in FIG. 6, the controller 250 may confirm that during the time when the sensing data 601 is collected, 7 operations of level 1 (INFO), 2 operations of level 2 (WARN), and 1 operation of level 3 (ERROR) are generated according to the operation of the collaborative robot 100. The controller 250 may display the failure data, which is generated by combining the sensing data and the operation data at a time point when the operation data whose severity is level 2 (WARN) and level 3 (ERROR) is confirmed, on the display 230.

The exemplary embodiments of the present invention disclosed in the present specification and drawings are merely provided for specific examples in order to easily explain the technical contents of the present invention and help the understanding of the present invention, and are not intended to limit the scope of the present invention. Therefore, the scope of the present invention should be construed as including all changes or modifications derived based on the technical spirit of the present invention in addition to the exemplary embodiments disclosed herein.

Since the present invention can provide a data management method and device for diagnosing a defect of a collaborative robot that performs the generation, collection and storage of data that is essentially required to diagnose a defect or failure of a collaborative robot, it has industrial applicability.

The invention claimed is:

1. A method for managing data for diagnosing a defect of a collaborative robot, comprising the steps of:
   generating, by an electronic device, a sensing data structure for managing sensing data collected from at least one collaborative robot;
   generating, by the electronic device, an operation data structure for managing operation data associated with the operation of the collaborative robot;
   generating, by the electronic device, a failure data structure for managing failure data at a time point when the operation has a severity that is greater than or equal to a threshold value;
   storing, by the electronic device, data collected from the at least one collaborative robot according to the structure and
   diagnosing a defect or failure of the collaborative robot, wherein the step of generating an operation data structure comprises the steps of:

checking the operation data at a time point when the operation occurs in the collaborative robot; and defining the severity of the operation of the collaborative robot as level 1, level 2 and level 3 based on the operation data, wherein the step of diagnosing a defect or failure of the collaborative robot comprises the steps of:

generating the failure data by combining the sensing data and the operation data at a time point when the operation data is collected, when the severity of the operation for operation data collected from the collaborative robot corresponds to any one of level 2 and level 3 and the failure data further includes the sensing data and the operation data corresponding to a time period before and after the time point; and confirming a time point when a defect or failure of the collaborative robot has occurred based on the failure data.

2. The method of claim 1, wherein the step of generating a sensing data structure is a step of generating the sensing date structure comprising data on specifications of the collaborative robot, data on a plurality of joints constituting the collaborative robot, and data on a plurality of sensors that are provided in the collaborative robot.

3. The method of claim 2, wherein the sensing data comprises physical information about the collaborative robot and is collected in real time or periodically from a plurality of sensors that are provided in the collaborative robot.

4. The method of claim 3, wherein the step of generating an operation data structure is a step of generating the operation data structure comprising the date and time according to the operation of the collaborative robot, the severity of the operation, an identifier for the operation, and detailed information associated with the operation.

5. The method of claim 4, wherein the operation data comprises operation information, status information, communication information and failure information of the collaborative robot, and is collected non-periodically according to the operation of the collaborative robot.

6. A hardware-based black box device for managing data for diagnosing a defect of a collaborative robot, comprising:

a physical communicator for performing communication with at least one collaborative robot;

a controller comprising a processor, the processor configured to:

generate a sensing data structure for managing sensing data collected from the collaborative robot, generate an operation data structure for managing operation data associated with the operation of the collaborative robot, generate a failure data structure for managing failure data at a time point when the operation has severity that is greater than or equal to a threshold value, and diagnose a defect or failure of the collaborative robot; and a non-transitory memory for storing the sensing data structure, the operation data structure and the failure data structure, wherein the processor defines the severity of the operation of the collaborative robot as level 1, level 2 and level 3 based on the operation data confirmed at a time point when the operation occurs in the collaborative robot, wherein the processor generates the failure data by combining the sensing data and the operation data at a time point when the operation data is collected, when the severity of the operation for operation data collected from the collaborative robot corresponds to any one of level 2 and level 3, and the failure data further includes the sensing data and the operation data corresponding to time periods before and after the time point, and wherein the processor confirms a time point when a defect or failure of the collaborative robot has occurred based on the failure data.

7. The hardware-based black box device of claim 6, wherein the controller processor generates the sensing data structure comprising data on specifications of the collaborative robot, data on a plurality of joints constituting the collaborative robot, and data on a plurality of sensors provided in the collaborative robot.

8. The hardware-based black box device of claim 7, wherein the processor generates the sensing data structure with the sensing data, which is physical information about the collaborative robot collected in real time or periodically from a plurality of sensors provided in the collaborative robot.

9. The hardware-based black box device of claim 8, wherein the processor generates the operation data structure comprising the date and time according to the operation of the collaborative robot, the severity of the operation, an identifier for the operation, and detailed information associated with the operation.

10. The hardware-based black box device of claim 9, wherein the processor generates the operation data structure with the operation data comprising operation information, status information, communication information and failure information about the collaborative robot collected non-periodically according to the operation of the collaborative robot.

* * * * *

UNITED STATES PATENT AND TRADEMARK OFFICE
CERTIFICATE OF CORRECTION

PATENT NO. : 12,423,272 B2  
APPLICATION NO. : 18/261440  
DATED : September 23, 2025  
INVENTOR(S) : Jung Won Lee et al.

Page 1 of 1

It is certified that error appears in the above-identified patent and that said Letters Patent is hereby corrected as shown below:

In the Claims

<u>Claim 7, Column 12, Line 26:</u>
Delete "the controller processor" and replace with -- the processor --.

Signed and Sealed this  
Twenty-fifth Day of November, 2025

John A. Squires  
*Director of the United States Patent and Trademark Office*